United States Patent
Lee

(10) Patent No.: US 8,813,610 B2
(45) Date of Patent: Aug. 26, 2014

(54) AUTOMATIC SCREW TIGHTENING APPARATUS

(75) Inventor: Yi-Lung Lee, Taichung (TW)

(73) Assignee: Tera Autotech Corporation, Taichung (TW)

( * ) Notice: Subject to any disclaimer, the term of this patent is extended or adjusted under 35 U.S.C. 154(b) by 245 days.

(21) Appl. No.: 13/529,676

(22) Filed: Jun. 21, 2012

(65) Prior Publication Data

US 2013/0340573 A1    Dec. 26, 2013

(51) Int. Cl.
*B23P 19/06*    (2006.01)

(52) U.S. Cl.
CPC ..................... *B23P 19/06* (2013.01)
USPC .......................... 81/57.37; 81/57.4

(58) Field of Classification Search
USPC ................ 81/57.37, 57.4; 29/240, 525.01
See application file for complete search history.

(56) References Cited

U.S. PATENT DOCUMENTS

| | | | |
|---|---|---|---|
| 6,973,856 B2 * | 12/2005 | Shibata | 81/57.4 |
| 7,040,196 B2 * | 5/2006 | Ormachea et al. | 81/57.4 |
| 7,930,955 B2 * | 4/2011 | Miyamoto | 81/54 |
| 2006/0150781 A1 * | 7/2006 | Ormachea et al. | 81/57.4 |
| 2007/0002315 A1 * | 1/2007 | Ban et al. | 356/237.1 |
| 2012/0067176 A1 | 3/2012 | Ota et al. | |
| 2012/0201448 A1 * | 8/2012 | Nammoto et al. | 382/153 |

* cited by examiner

*Primary Examiner* — David B Thomas
(74) *Attorney, Agent, or Firm* — Muncy, Geissler, Olds & Lowe, P.C.

(57) ABSTRACT

An automatic screw tightening apparatus is to fasten at least one screw into a screw hole of a workpiece and comprises a work platform, a movable carrying deck, an image observation module, a screw fastening module and a fastening inspection module. The movable carrying deck has a carrying portion to carry and hold the workpiece and a movement portion to control the workpiece moved sequentially to a first position, a second position and a third position that are respectively corresponding to the image observation module, screw fastening module and fastening inspection module to confirm the position of the screw hole, fasten the screw and inspect fastening correctness of the screw. Thus the workpiece can be assembled quickly and fastening can be done correctly to achieve mass production and reduce cost.

6 Claims, 7 Drawing Sheets

AUTOMATIC SCREW TIGHTENING APPARATUS

FIELD OF THE INVENTION

The present invention relates to a mechanical automatic apparatus and particularly to an automatic screw tightening apparatus.

BACKGROUND OF THE INVENTION

Automatic machineries can replace manpower and increase production speed and reduce costs. Assembly of machinery elements usually requires screws to fasten a plurality of objects together. In order to improve production efficiency and reduce cost using automatic equipments to fasten screws is a speedy solution. For instance, U.S. publication No. 20120067176 entitled "AUTOMATIC SCREW TIGHTENING APPARATUS" discloses a method and apparatus to tighten screws automatically.

Constant advance of integrated circuit manufacturing process and design has greatly improved performances and functions of electronic elements of a given size. On the other hand, digital products such as computers, communication electronic products and consumer electronics have rapid progresses that make their assembly increasingly difficult. For instance, now screws are almost smaller than 2 mm that are hard to be picked up for arrangement through the technique disclosed in the aforesaid U.S. publication No. 20120067176, thus tightening the screws is almost impossible. With the size of the screws become smaller, fastening difficulty also increases. Moreover, accurate alignment of screw holes and screws prior to fastening also becomes more challenging. As electronic products nowadays demand high degrees of precision, incomplete fastening of the screws into screw holes make the screws jutting to a higher elevation that affects coupling precision and assembly accuracy in the downstream processes. There are still rooms for improvement.

SUMMARY OF THE INVENTION

The primary object of the present invention is to enhance correctness, precision and stability of screw fastening.

To achieve the foregoing object, the present invention provides an automatic screw tightening apparatus to fasten at least one screw into a screw hole of a workpiece. The automatic screw tightening apparatus comprises a work platform, a movable carrying deck, an image observation module to observe a screw hole position on the workpiece, a screw fastening module to fasten the screw obtained from a screw holding set to the workpiece, and a fastening inspection module to inspect fastening correctness of the screw.

The movable carrying deck has a carrying portion to carry and hold the workpiece and a movement portion connecting to the carrying portion. The movement portion controls the workpiece moved sequentially to a first position, a second position and a third position. The image observation module is fixedly located on the work platform corresponding to the first position to provide screw hole information. The screw fastening module is fixedly located on the work platform corresponding to the second position to receive the screw hole information and fasten the screw into the workpiece. The fastening inspection module is fixedly located on the work platform corresponding to the third position to inspect the fastening correctness of the screw.

Through the construction set forth above, by positioning the image observation module, screw fastening module and fastening inspection module respectively at the first position, second position and third position, processes of confirming the screw hole position, fastening the screw and inspecting the fastening correctness can be performed to automatically fasten screws in increasingly precise electronic products, thereby automatic assembly of the products can be achieved to get the advantages of mass production and lower labor cost.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
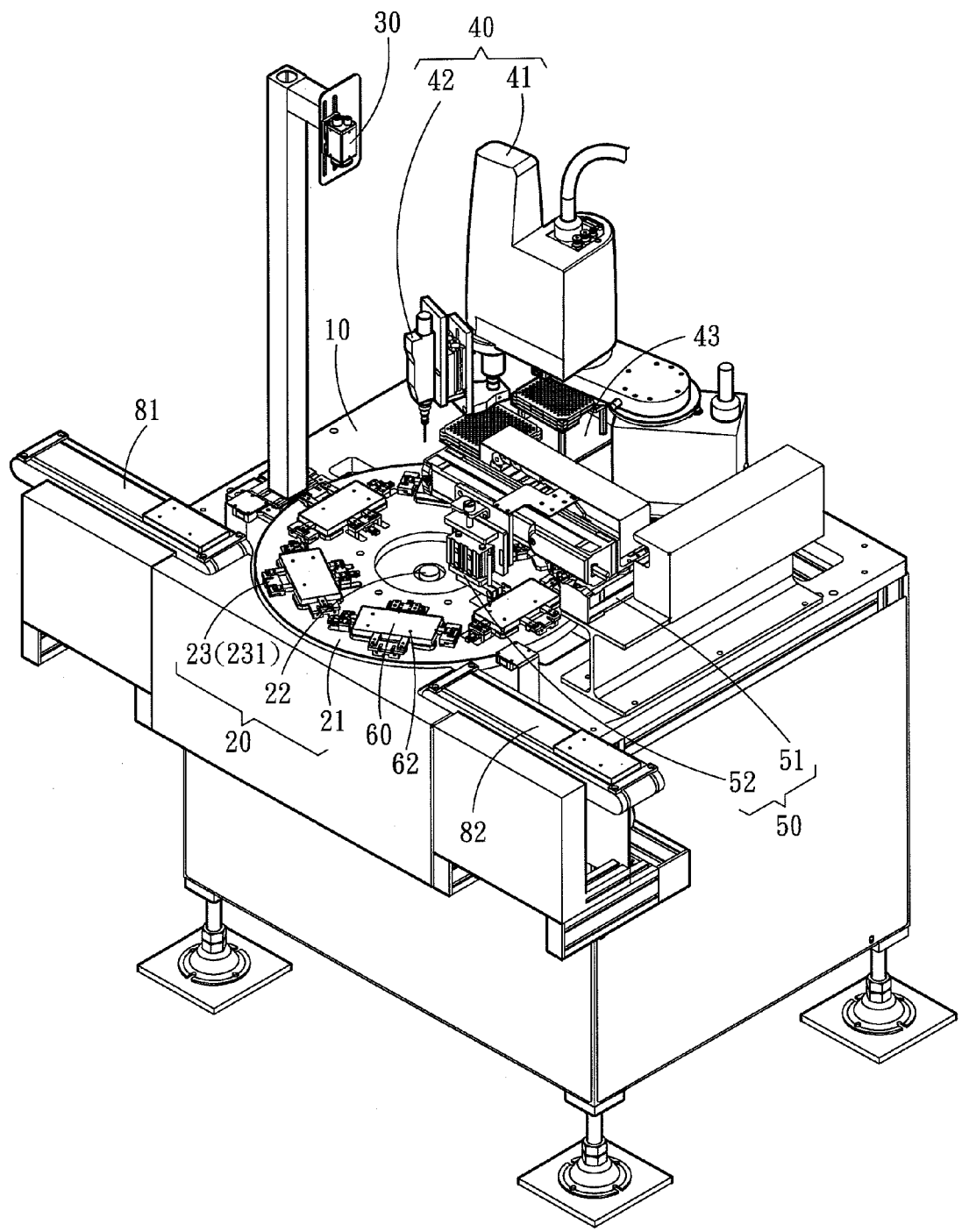
FIG. 1 is a perspective view of the structure of the invention.

Please refer to FIGS. 1 and 4A through 4C, the present invention aims to provide an automatic screw tightening apparatus to fasten at least one screw 61 (referring to FIG. 2B) into a screw hole 62 of a workpiece 60. The automatic screw tightening apparatus comprises a work platform 10, a movable carrying deck 20, an image observation module 30 to observe a screw hole position on the workpiece 60, a screw fastening module 40 to fasten the screw 61 obtained from a screw holding set 43 to the workpiece 60, and a fastening inspection module 50 to inspect fastening correctness of the screw 61.

The movable carrying deck 20 has a carrying portion 21 to carry and hold the workpiece 60 and a movement portion 22 connected to the carrying portion 21. In this embodiment the carrying portion 21 is a circular disk. The movable carrying deck 20 further has at least one holding set 23 to hold the workpiece 60 on the carrying portion 21. The holding set 23 includes multiple pieces that are formed in rectangular to mate the common portable devices such as handsets. The holding set 23 includes four clamp members 231 to clamp elastically the workpiece 60 in four directions according the size of the workpiece 60. The movement portion 22 controls the workpiece 60 moved sequentially to a first position 71, a second position 72 and a third position 73. The image observation module 30 is fixedly located on the work platform 10 corresponding to the first position 71, and can be a CCD or CMOS video camera to confirm the position of the screw hole on the workpiece 60 and provide screw hole information.

Figure 2A:
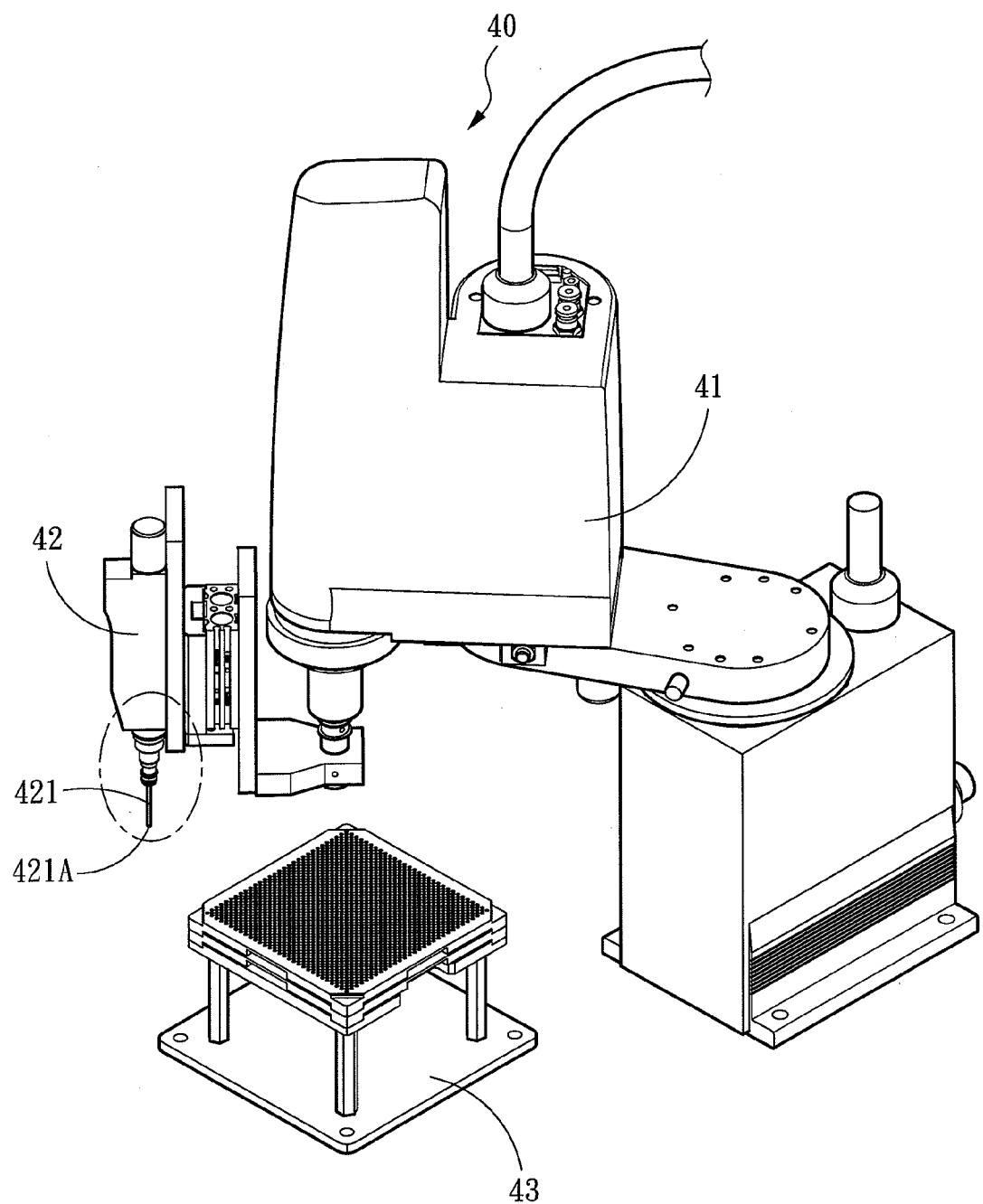
FIG. 2A is a perspective view of the screw fastening module of the invention.
Figure 2B:
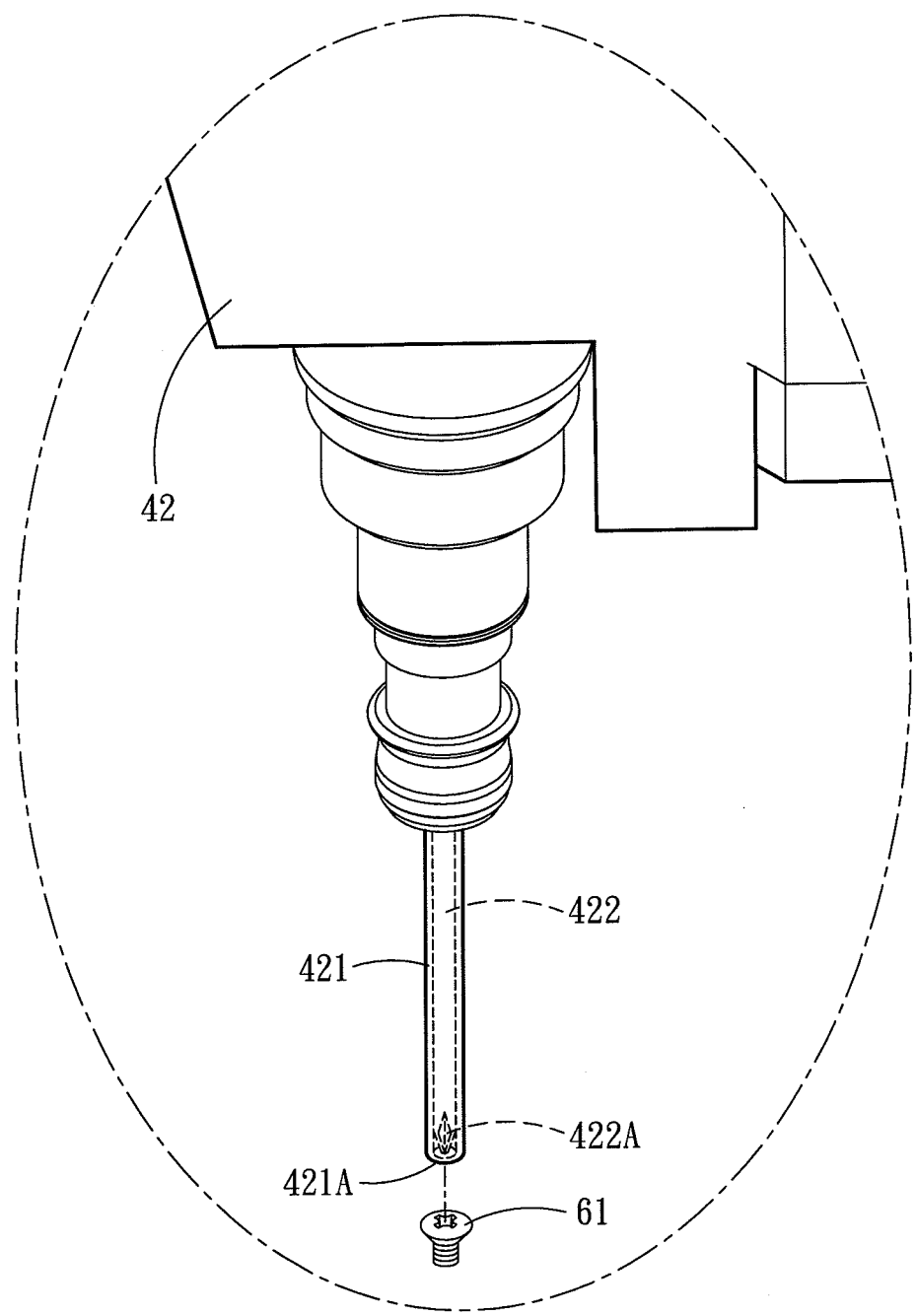
FIG. 2B is a fragmentary enlarged view according to FIG. 2A.

Also referring to FIGS. 2A and 2B, the screw fastening module 40 is fixedly located on the work platform 10 corresponding to the second position 72. The screw fastening module 40 has a rotary arm 41 and a screw fastening portion 42 located on the rotary arm 41. The screw fastening portion 42 has a suction tube 421 and a fastener 422 located in the suction tube 421. The suction tube 421 further has a suction port 421A to suck the screw 61. The fastener 422 has a fastening end 422A corresponding to the suction port 421A to contact the screw 61. To mate the modern portable electronic products that are made in thin and light, the screw 61 being used generally is formed at a length less than 3 mm. As a result, fetching and fastening the screw 61 is quite difficult. Therefore the invention provides the suction tube 421 with the suction port 421A to suck the screw 61 from the screw holding set 43, and with the fastening end 422A of the fastener 422 to contact the screw 61. Based on the screw hole information obtained by the image observation module 30, the screw 61 can be fastened into the screw hole 62 of the workpiece 60.

Figure 3:
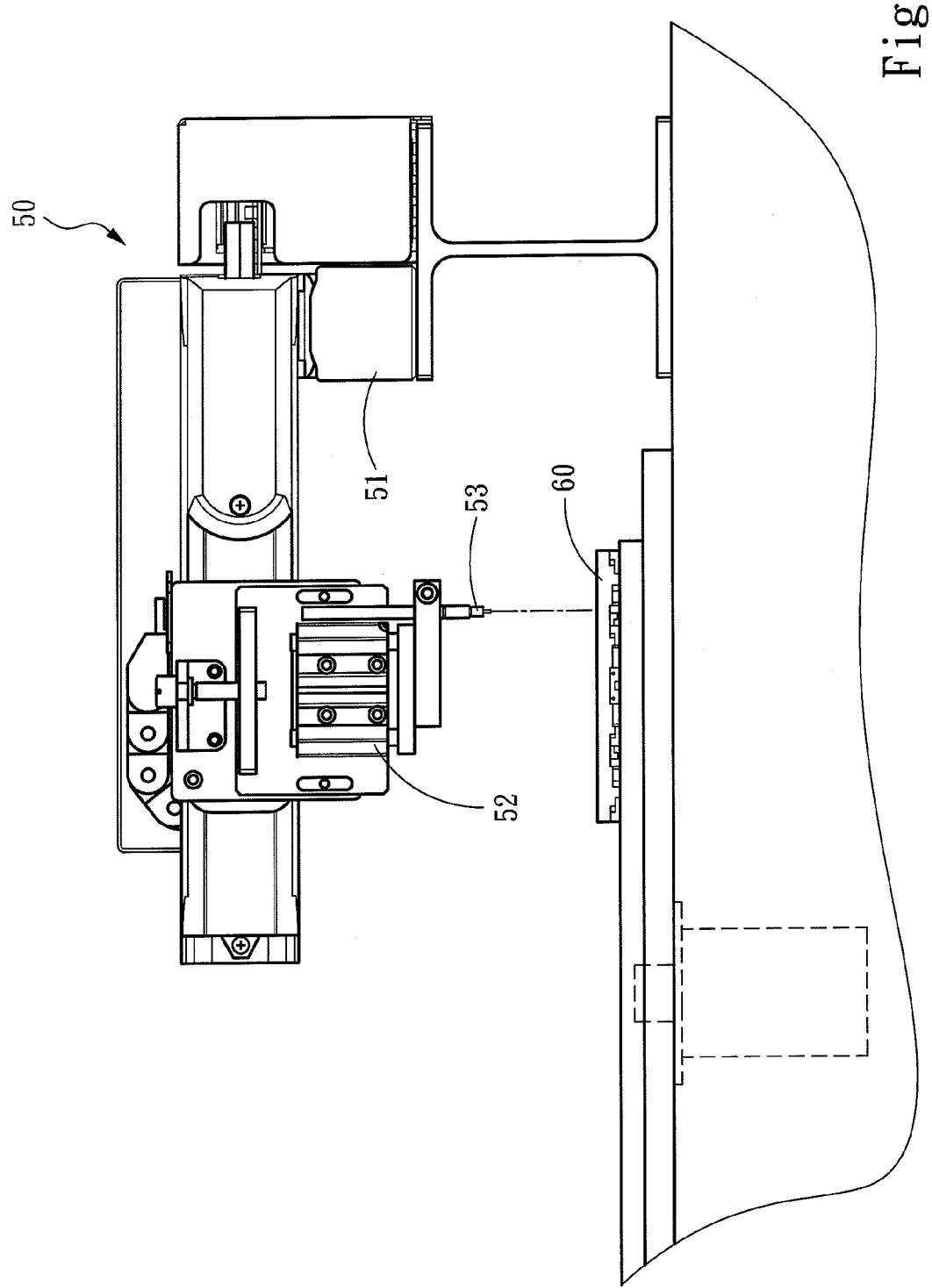
FIG. 3 is a schematic side view of the fastening inspection module of the invention.

Also referring to FIG. 3, the fastening inspection module 50 is fixedly located on the work platform 10 corresponding to the third position 73 to inspect fastening correctness of the screw 61. More specifically, the fastening inspection module 50 includes a horizontal movement element 51, a vertical movement element 52 connected to the horizontal movement 51 and an elevation probe 53 connected to the vertical movement element 52. The horizontal movement element 51 controls the horizontal movement of the elevation probe 53 corresponding to the screw hole 62 where the screw 61 has been fastened; then the vertical movement element 52 moves the elevation probe 53 up or down vertically until touching the screw 61, thereby the elevation of the screw 61 can be judged to confirm whether the screw 61 has been normally and securely fastened into the screw hole 62.

In addition, the work platform 10 also has a feed conveying portion 81 and a discharge conveying portion 82. The feed conveying portion 81 is adjacent to the first position 71, and the discharge conveying portion 82 is adjacent to the third position 73. Hence the workpiece 60 not yet finish fastening can be removed manually from the feed conveying portion 81 and placed onto the movable carrying deck 20 to be clamped by the holding set 23; after fastening of the screw 61 is finished, the workpiece 60 is then removed from the holding set 23 and placed onto the discharge conveying portion 82 to proceed with the next fabrication process. The clamping and removing processes previously discussed also can be done via robotic arms to achieve full automation.

Figure 4A:
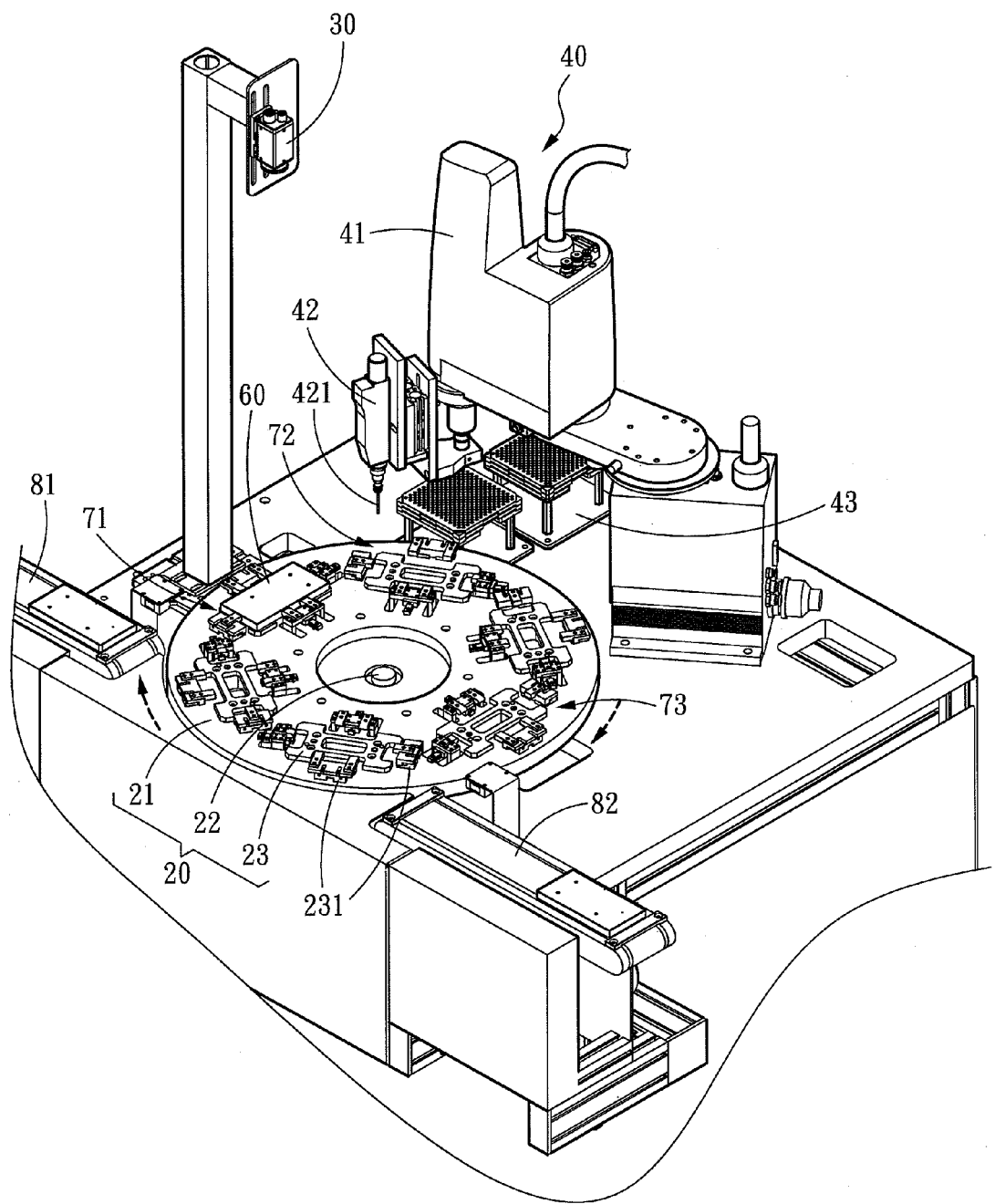
FIGS. 4A, 4B and 4C are schematic views of the invention in continuous operation conditions.
Figure 4B:
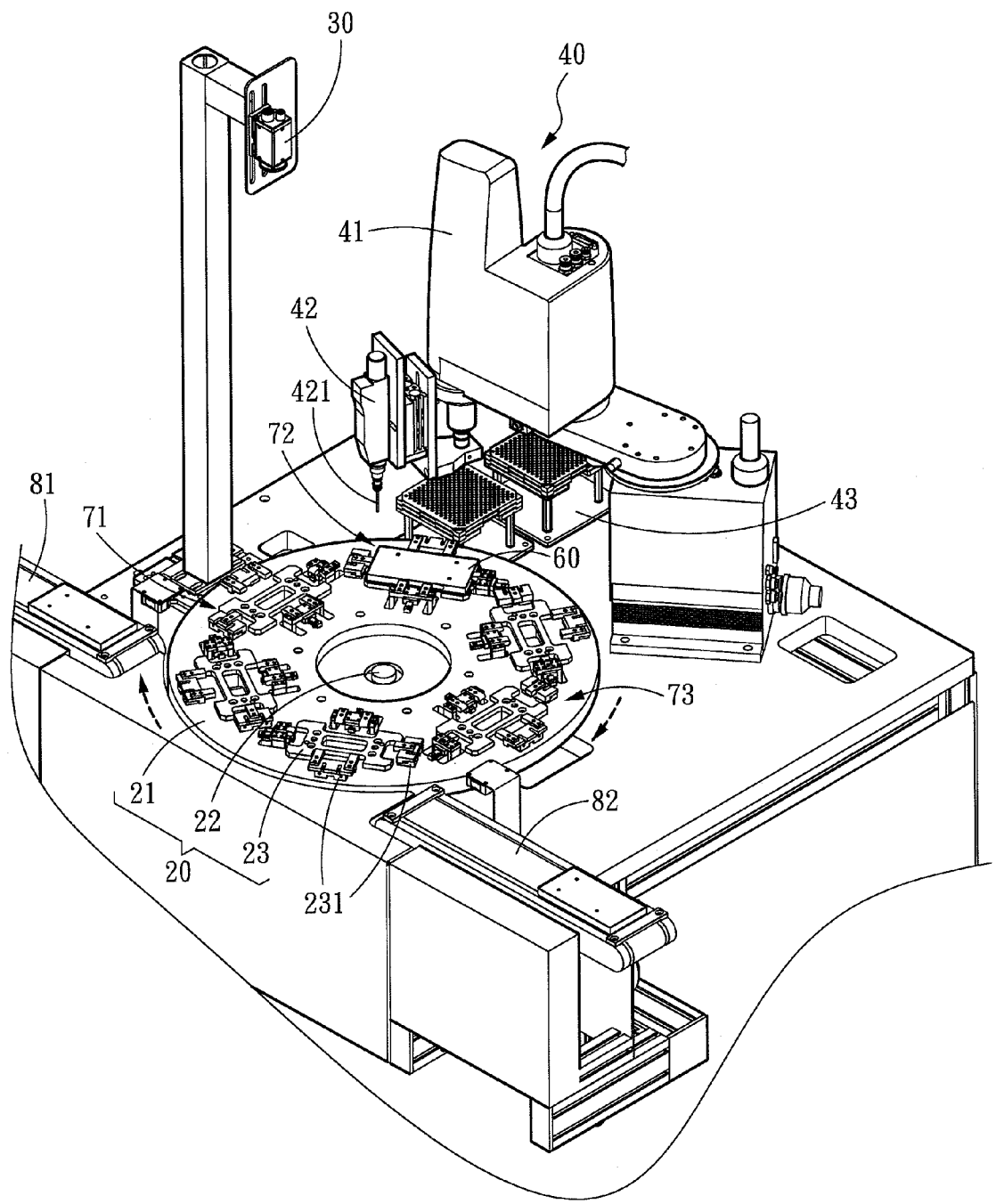
Figure 4C:
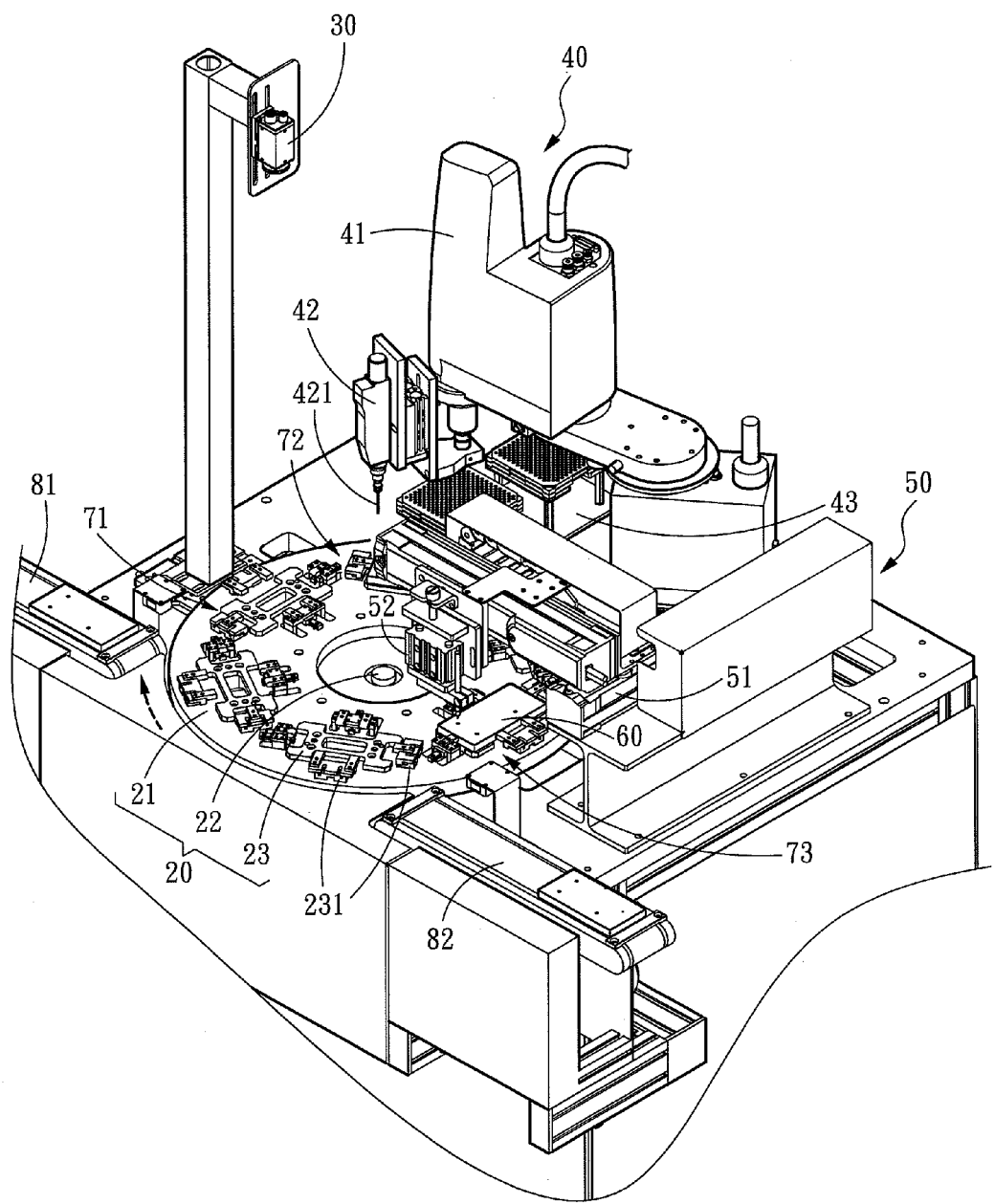

Referring to FIGS. 4A, 4B and 4C, in which the fastening inspection module 50 is omitted to facilitate discussion of operation of the invention. First, the workpiece 60 is positioned onto the movable carrying deck 20 which carries the workpiece 60 to the first position 71 as shown in FIG. 4A; next, the image observation module 30 located correspondingly to the first position 71 observes the screw hole position on the workpiece 60 and gets the screw hole information to do inspection before operation; in the event that errors occur to the position, an error compensation procedure is performed. Then, referring to FIG. 4B, the workpiece 60 is moved to the second position 72, and the screw fastening module 40 located correspondingly to the second position 72 receives the screw hole information and fastens the screw 61 into the screw hole of the workpiece 60; finally, referring to FIG. 4C, the workpiece 60 is moved to the third position 73, and the fastening inspection module 50 located correspondingly to the third position 73 inspects the correctness of the screw 61 fastened into the screw hole 62. More specifically, the elevation probe 53 of the fastening inspection module 50 is moved correspondingly to the position of the screw hole 62, and then is moved vertically downwards until touching the screw 61; through inspecting the elevation of the screw 61, the relative position between the screw 61 and screw hole 62 and fastening correctness can be determined.

As a conclusion, compared with the conventional techniques, the invention provides features as follows:

1. By disposing the image observation module, screw fastening module and fastening inspection module respectively at the first position, second position and third position, the processes of confirming the screw hole position, fastening the screw and inspecting the fastening correctness can be performed to achieve automatic screw fastening and increase the correctness thereof in precise electronic products.

2. Through the automatic production facilities the benefits of mass production and lower labor cost can be realized.

3. Through the suction tube and fastener located in the suction tube screws with a length smaller than 3 mm can be fastened.

4. Through the elevation probing of the fastening inspection module, screw fastening correctness can be confirmed.

While the preferred embodiment of the invention has been set forth for the purpose of disclosure, it is not the limitation of the invention, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automatic screw tightening apparatus to fasten at least one screw into at least one screw hole on a workpiece, comprising:
   a work platform;
   a movable carrying deck including a carrying portion to carry and hold the workpiece and a movement portion connected to the carrying portion to control the workpiece moved sequentially to a first position, a second position and a third position;
   an image observation module which is fixedly located on the work platform corresponding to the first position and observes a screw hole position of the workpiece to provide screw hole information;
   a screw fastening module which is fixedly located on the work platform corresponding to the second position and receives the screw hole information and fastens the at least one screw to the workpiece; and
   a fastening inspection module which is fixedly located on the work platform corresponding to the third position and inspects fastening correctness of the at least one screw.

2. The automatic screw tightening apparatus of claim 1, wherein the carrying portion is a circular disk structure and the movable carrying deck further includes at least one holding set to hold the workpiece on the carrying portion, the at least one holding set being located remote from a center of the carrying portion.

3. The automatic screw tightening apparatus of claim 1, wherein the screw fastening module includes a rotary arm and a screw fastening portion located on the rotary arm.

4. The automatic screw tightening apparatus of claim 3, wherein the screw fastening portion includes a suction tube and a fastener located in the suction tube, the suction tube including a suction port to suck the screw, the fastener including a fastening end corresponding to the suction port to contact the screw.

5. The automatic screw tightening apparatus of claim 1, wherein the fastening inspection module includes a horizontal movement element, a vertical movement element connected to the horizontal movement element and an elevation probe connected to the vertical movement element.

6. The automatic screw tightening apparatus of claim 1 further including a feed conveying portion on the work platform adjacent to the first position and a discharge conveying portion on the work platform adjacent to the third position.

* * * * *